(12) United States Patent
McClelland et al.

(10) Patent No.: US 11,305,807 B2
(45) Date of Patent: Apr. 19, 2022

(54) VEHICLE STEERING COLUMN

(71) Applicants: THYSSENKRUPP PRESTA AG, Eschen (LI); thyssenkrupp AG, Essen (DE)

(72) Inventors: Luke McClelland, Indianapolis, IN (US); Kevin Templin, Fishers, IN (US); Adam Cabaj, West Chester, OH (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/001,865

(22) Filed: Aug. 25, 2020

(65) Prior Publication Data

US 2022/0063703 A1 Mar. 3, 2022

(51) Int. Cl.
*B62D 1/181* (2006.01)
*B62D 1/19* (2006.01)
*B62D 1/185* (2006.01)

(52) U.S. Cl.
CPC ............ *B62D 1/181* (2013.01); *B62D 1/192* (2013.01); *B62D 1/195* (2013.01); *B62D 1/185* (2013.01)

(58) Field of Classification Search
CPC ........ B62D 1/181; B62D 1/195; B62D 1/192; B62D 1/185
See application file for complete search history.

(56) References Cited

U.S. PATENT DOCUMENTS

| | | | | |
|---|---|---|---|---|
| 5,520,416 A | * | 5/1996 | Singer, III | B62D 1/181 |
| | | | | 280/775 |
| 9,616,914 B2 | | 4/2017 | Stinebring | |
| 10,023,222 B2 | * | 7/2018 | Tinnin | B62D 1/192 |
| 10,759,465 B2 | * | 9/2020 | Ganahl | B62D 1/184 |
| 10,787,191 B2 | * | 9/2020 | Kreutz | B62D 5/0409 |
| 10,960,917 B2 | * | 3/2021 | Schnitzer | B62D 1/195 |
| 10,974,757 B2 | * | 4/2021 | Raich | B62D 1/185 |
| 11,104,368 B2 | * | 8/2021 | Bueker | B62D 1/184 |

(Continued)

FOREIGN PATENT DOCUMENTS

| | | |
|---|---|---|
| DE | 102015225488 A | 12/2016 |
| DE | 102016212303.3 A | 1/2018 |

(Continued)

*Primary Examiner* — Drew J Brown
(74) *Attorney, Agent, or Firm* — thyssenkrupp North America, LLC

(57) ABSTRACT

A steering column for a vehicle includes a support assembly configured to attach to the vehicle. An axially movable steering spindle jacket is disposed in the support assembly. A jacket housing is attached to the steering spindle jacket. The jacket housing includes a slot formed therethrough and an interior space accessible through the slot. An energy absorbing element is disposed within the interior space and is attached to the jacket housing. A motor drive assembly is configured to cause the steering spindle jacket to extend and retract axially. A length adjustment support is operatively attached to the motor drive assembly and configured to engage the energy absorbing element, wherein during an impact event movement of the steering spindle jacket relative to the length adjustment support causes a post to actuate the energy absorbing element to reduce the effects of the impact.

18 Claims, 14 Drawing Sheets

(56) References Cited

U.S. PATENT DOCUMENTS

| | | | | |
|---|---|---|---|---|
| 2019/0176870 A1* | 6/2019 | Ganahl | ................. | B62D 1/195 |
| 2020/0207403 A1* | 7/2020 | Kirmsze | ................. | B62D 1/195 |
| 2020/0317251 A1* | 10/2020 | Munding | ................ | B62D 1/192 |
| 2021/0024121 A1* | 1/2021 | Matsuno | ................ | B62D 1/185 |

FOREIGN PATENT DOCUMENTS

| | | | | |
|---|---|---|---|---|
| DE | 102016212307.6 A | 1/2018 | | |
| DE | 102016214709.9 A | 2/2018 | | |
| DE | 102018102946.2 A | 8/2019 | | |
| DE | 102019201621 A1 * | 8/2020 | ............ | B62D 1/181 |
| WO | WO-2017125311 A1 * | 7/2017 | ............ | B62D 1/192 |

* cited by examiner

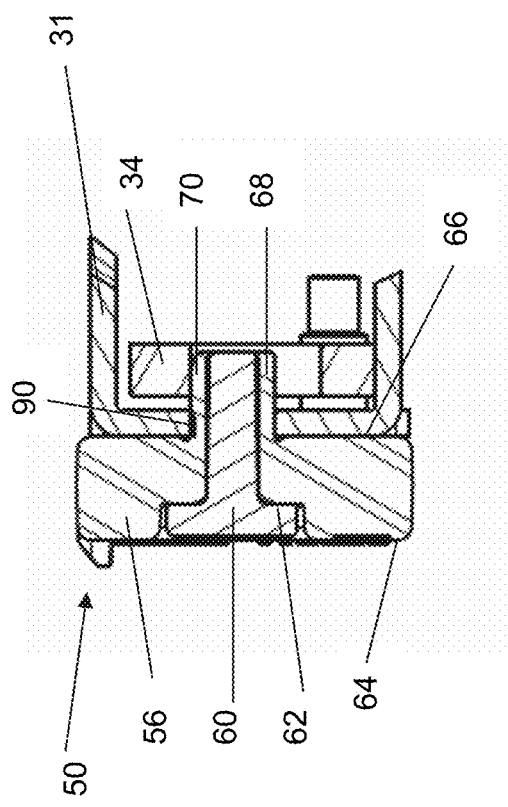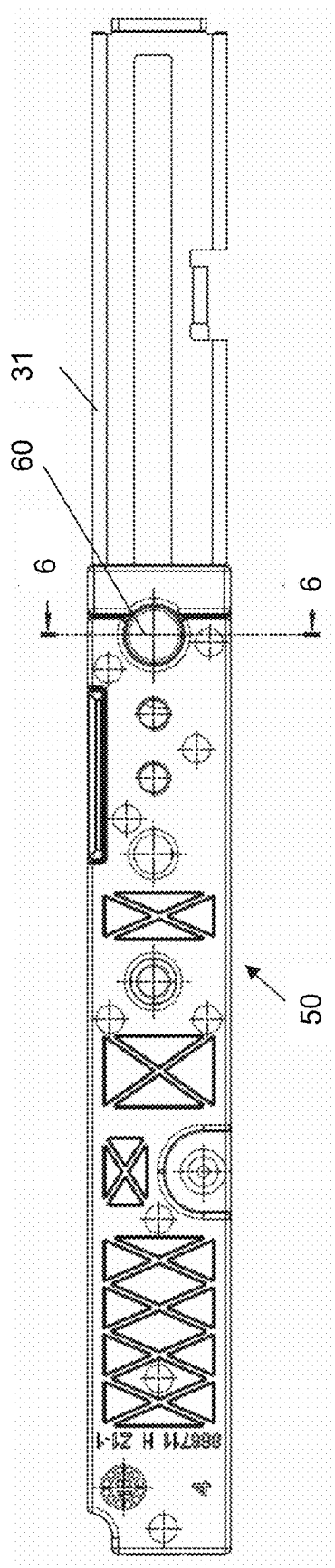
FIG. 6
FIG. 5

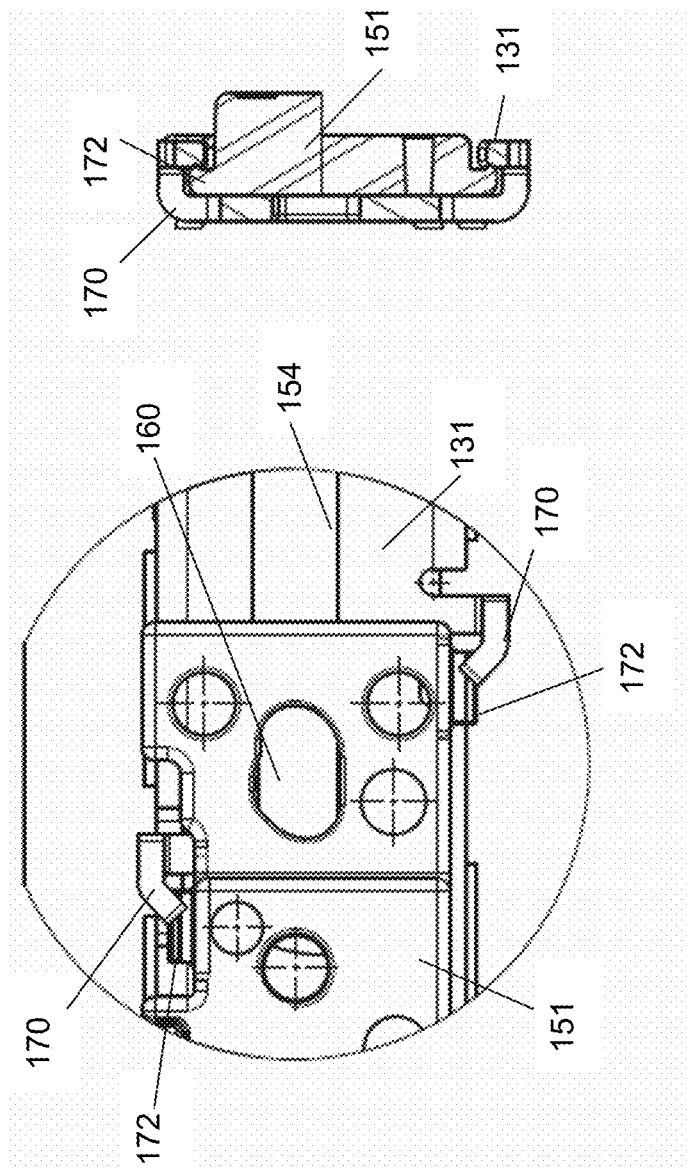

VEHICLE STEERING COLUMN

FIELD

The present invention relates to steering column assemblies for motor vehicles.

BACKGROUND

Steering columns for motor vehicles are no longer constructed of a bracket that holds a plain rotatable shaft interconnecting a steering wheel to a steering gearbox. Modern steering columns provide multiple features including vertical and axial adjustability for user comfort and controlled displacement safety features utilizing energy absorption features that reduce the effects of a vehicle crash.

Such modern steering columns typically include a supporting unit in the form of a housing and/or bracket parts configured to connect to the frame of the motor vehicle, for example, and a displacement unit which is movably held on the supporting unit and includes a steering column tube. A steering spindle is mounted rotatably in the steering column tube and is configured to receive and convey steering input from a steering wheel operated by a user of the vehicle to a mechanism that causes steering actuation of the steering wheels of the vehicle.

The displacement unit is arranged displaceably in relation to the supporting unit in order, in the event of a crash, to absorb impact energy by way of a controlled displacement of the displacement unit in relation to the supporting unit, to reduce the physical effects of the crash on the driver of the vehicle. When the displacement unit is displaced in a crash event, in relation to the supporting unit, an energy absorption device, including a crash wire or wires, as is well known, is caused to deform so as to absorb the crash energy in a controlled manner.

Complicating the configuration of the steering column and energy absorption device is the desire to provide adjustment capability to the position of the steering column in relation to the user for operating safety and comfort. In some cases, the adjustment is performed with well-known mechanical assemblies and position securing mechanisms. More recently, vehicles have been equipped with motorized adjustment mechanisms, which for convenience, offer the ability to store and recall preferred adjustment settings in addition to easy adjustability.

It can be envisioned that in order to provide adjustability in a mechanism critical for the safe operation of the vehicle, that elements of the adjustment and energy absorption mechanisms must operate smoothly and reliably and maintain close physical tolerances to prevent interference or misalignment of the various parts of the assemblies in a compact space which could lead to a loss of performance of the various systems or worse, produce failure of one or more of the systems.

There is a need, therefore, to provide both adjustability and energy absorption mechanisms in a compact steering column assembly. The present invention satisfies the need.

SUMMARY

An aspect of the invention is a steering column for a vehicle includes a support assembly configured to attach to the vehicle. An axially movable steering spindle jacket is disposed in the support assembly. A jacket housing is attached to the steering spindle jacket. The jacket housing includes a slot formed therethrough and an interior space accessible through the slot. An energy absorbing element is disposed within the interior space and is attached to the jacket housing. A motor drive assembly is configured to cause the steering spindle jacket to extend and retract axially. A length adjustment support is operatively attached to the motor drive assembly and configured to engage the energy absorbing element, wherein during an impact event movement of the steering spindle jacket relative to the length adjustment support causes a post to actuate the energy absorbing element to reduce the effects of the impact.

In another aspect of the invention, the energy absorbing element is a crash wire. The length adjustment support may comprise the post which extends through the slot. The post may be configured as a hollow sleeve. The sleeve may be a one-piece construction of the length adjustment support. The energy adsorption assembly may further include a pin that is sized and shaped to be inserted into the sleeve and when so inserted causes the sleeve to expand. The pin may be in the form of a screw. When the pin is inserted into the sleeve, the sleeve expands to an extent that the sleeve is captured by the slot and the length adjustment support is caused to be retained on the jacket housing. The length adjustment support may include a support body and a separate pin body, the pin body comprising the post. The post may be solid. The jacket housing may include retaining arms and the support body and the pin body both may include retaining tabs. The retaining arms may be disposed on the jacket housing so as to engage with the retaining tabs so as to retain the length adjustment support to the jacket housing and permitted to slide axially in an impact event.

In yet another aspect of the invention a steering column for a vehicle includes a support assembly configured to attach to the vehicle. An axially movable steering spindle jacket is disposed in the support assembly. A jacket housing is attached to the steering spindle jacket, the jacket housing comprising a slot formed therethrough and an interior space accessible through the slot. An energy absorbing element is disposed within the interior space and is attached to the jacket housing. A motor drive assembly is configured to cause the steering spindle jacket to extend and retract axially and a length adjustment support is operatively attached to the motor drive assembly and configured to engage the energy absorbing element. During an impact event movement of the steering spindle jacket relative to the length adjustment support causes a post to actuate the energy absorbing element to reduce the effects of the impact.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 is a side view of the length adjustment support and rail.

FIG. 6 is a sectional view through FIG. 5.

FIG. 13 is a close up view of the retaining hooks on the channel of FIG. 12.

FIG. 14 is a sectional view of FIG. 13.

DETAILED DESCRIPTION

For purposes of the description hereinafter, the terms "upper, lower, right, left, vertical, horizontal, top, bottom, lateral, longitudinal" and other terms of orientation or position and derivatives thereof, shall relate to the invention as it is depicted in the figures. The term "configured" or "configuration" will be understood as referring to a structural size and/or shape. It is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

Figure 1:
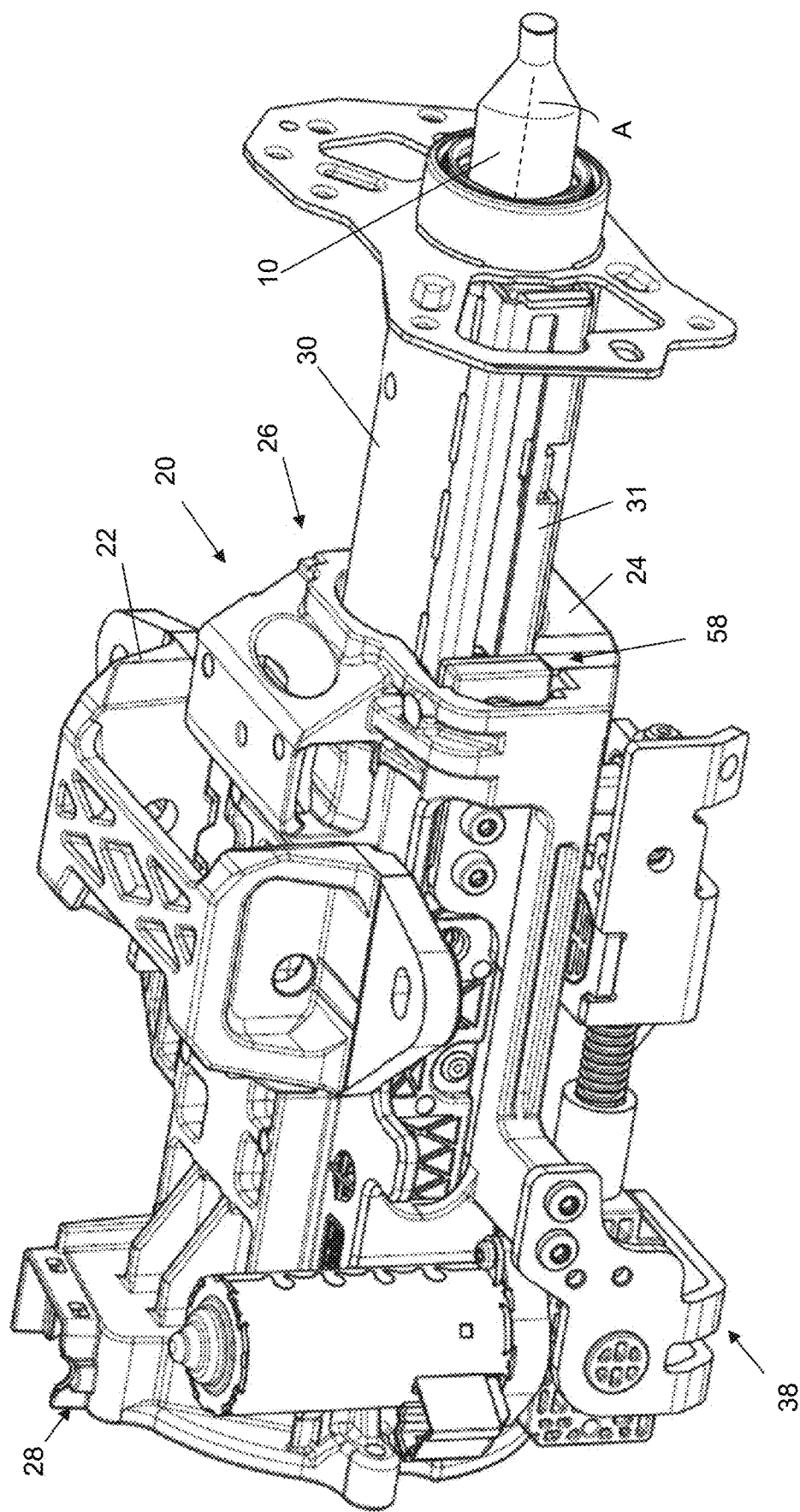
FIG. 1 is a perspective view of a steering column assembly.

An example of a steering column 20 according to the disclosure is shown in FIG. 1. In general, the steering column 20 generally includes a number of subassemblies. The steering column 20 includes a support assembly 22, which is configured to attach to a vehicle (not shown), such as an automobile or any suitable vehicle, and preferably to a frame or cross car beam of the vehicle. The support assembly 22 will be understood to include a conventional framework and/or housing 24 or multiple such elements configured to hold the steering column 20 to a vehicle frame and accommodate all of the subassemblies that are attached thereto or operatively associated therewith as will be explained herein. Such support assemblies are formed of metal or any suitable material. For purposes of orientation, the support assembly 22 includes a proximal end 26 that is disposed nearest to the user of the steering column 20 and a distal end 28 that is disposed away from the user, wherein the user of the vehicle may be considered the operator or driver of the vehicle.

The support assembly 22 is shaped and sized to receive a steering spindle jacket 30. The steering spindle jacket 30 is received within the support assembly 22 and may project from the proximal end and is configured to extend and retract from the support assembly in a linear direction along axis A. The steering spindle jacket 30 includes a control module mount 32 that is shaped and sized to receive and attach to a steering column control module (not shown) as is well known and the steering spindle jacket 30 bears a rotatable steering wheel shaft 10 as is well known.

The steering spindle jacket 30 includes a jacket housing 31 attached to the outside of the jacket. The jacket housing 31 may be rectangular or C-shaped or similar shaped bracket that is shaped and sized to house inside one or more energy absorbing elements or assemblies (see elements 34 and 36 in FIG. 7, for example). The structure of the jacket housing 32 and energy elements 34, 36, will be shown and described in more detail in following figures.

The steering column 20 includes a motor drive assembly 38. The motor drive assembly 38 is configured, when actuated, to cause the steering spindle jacket 30 to extend and retract along axis A in relation to the support assembly 22.

Figure 2:
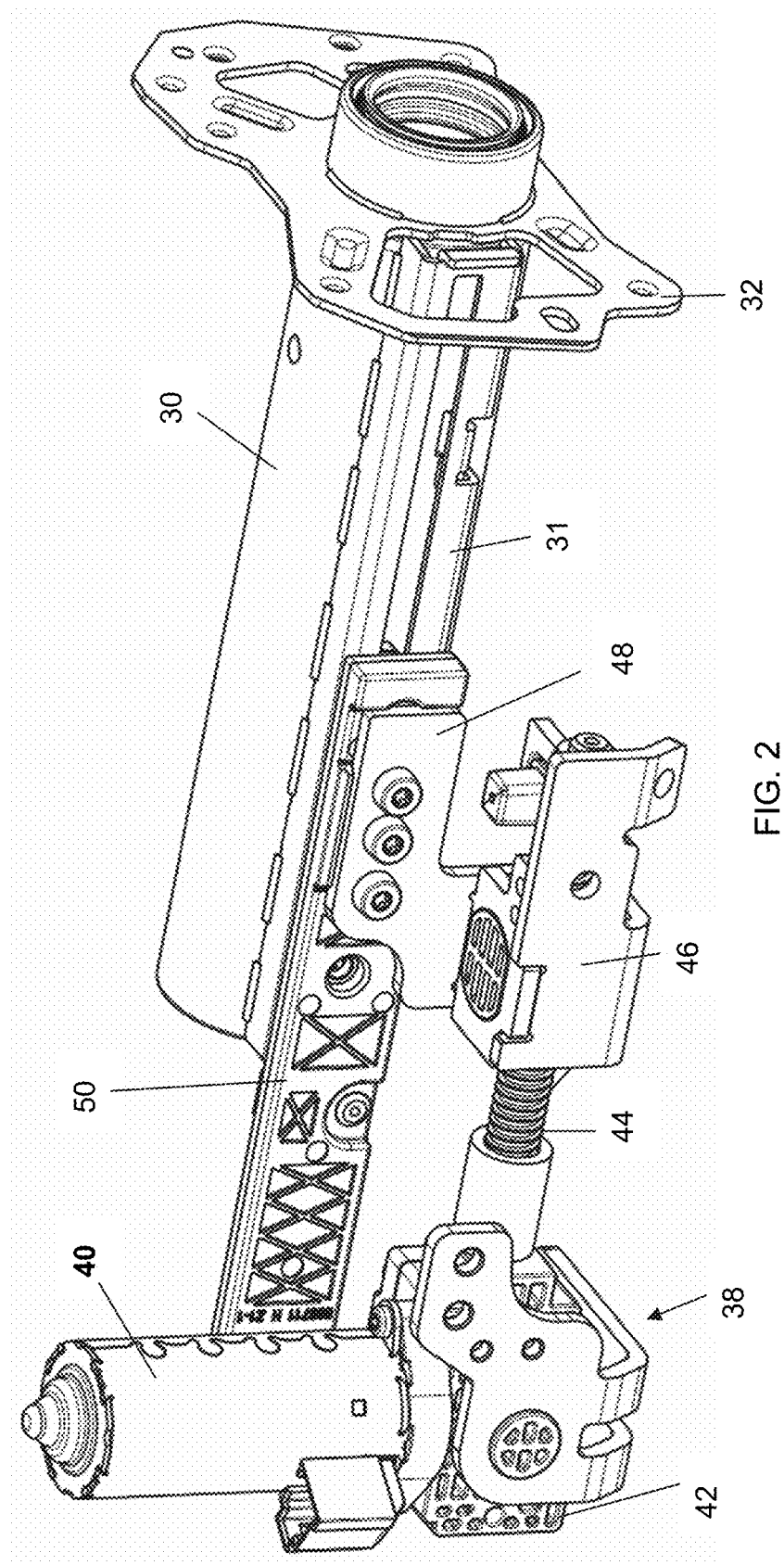
FIG. 2 is a perspective view of a steering column assembly with the support assembly removed.

Turning to FIG. 2, the motor drive assembly 38 is attached to the support assembly 22 (see FIG. 1) and may include a motor 40. The motor 40 may be a conventional electric motor. A gearbox 42 is operatively connected to the motor such that operation of the motor causes the gearbox to transmit rotational force from the motor through the gearbox. The gearbox 42 may be a reduction gearbox, mitre gear, worm/worm gear, belt drive, or bevel gearbox or any suitable mechanism that adapts the forces transmitted or changes direction of the forces transmitted. A drive screw 44 is turned by operation of the gearbox 42. The drive screw 44 engages with a captured nut 46 or the like. The nut 46 is captured or housed on a drive bracket 48 that is attached to a length adjustment support 50. The length adjustment support 50 interacts with the steering spindle jacket 30 and through the jacket housing 31 in a manner that will described in detail hereinbelow.

Figure 3:
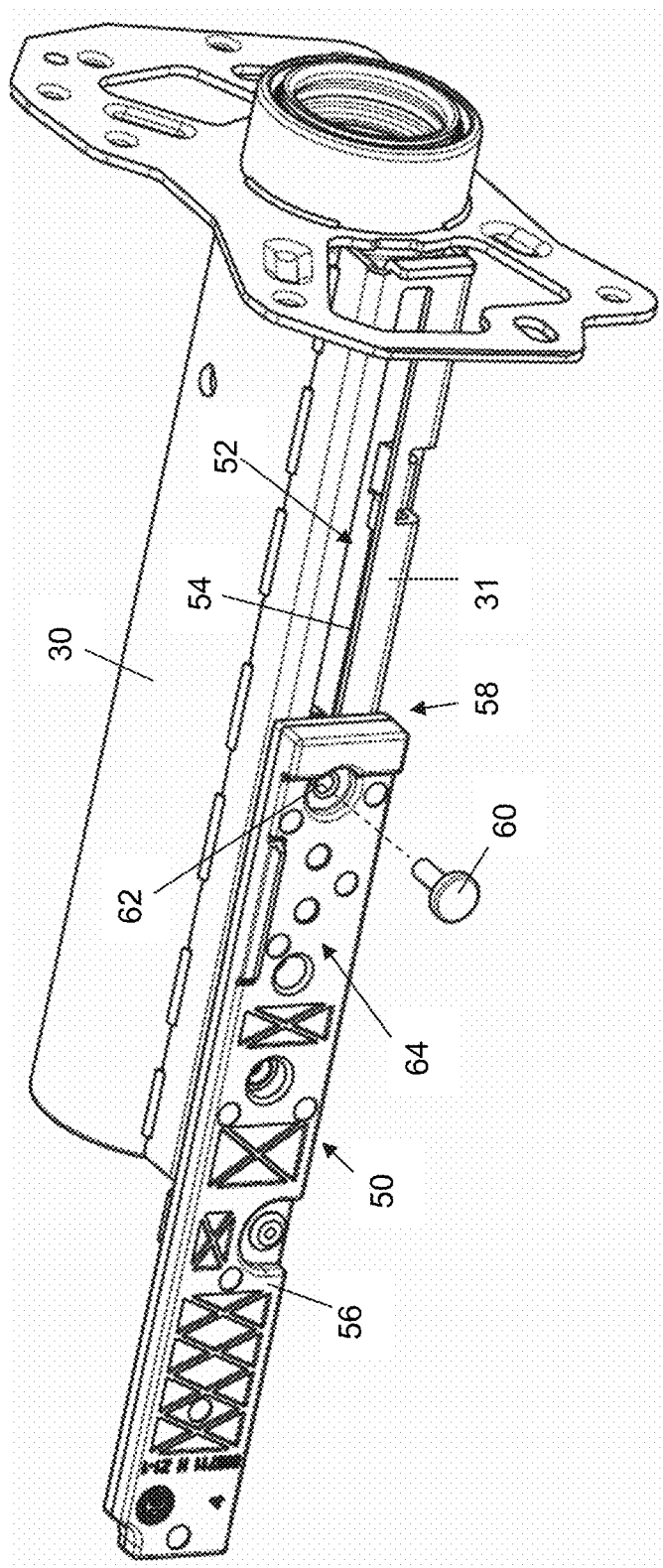
FIG. 3 is a perspective view of a steering column assembly with the support assembly and motorized adjustment assembly removed to show the length adjustment support in an unassembled state.
Figure 4:
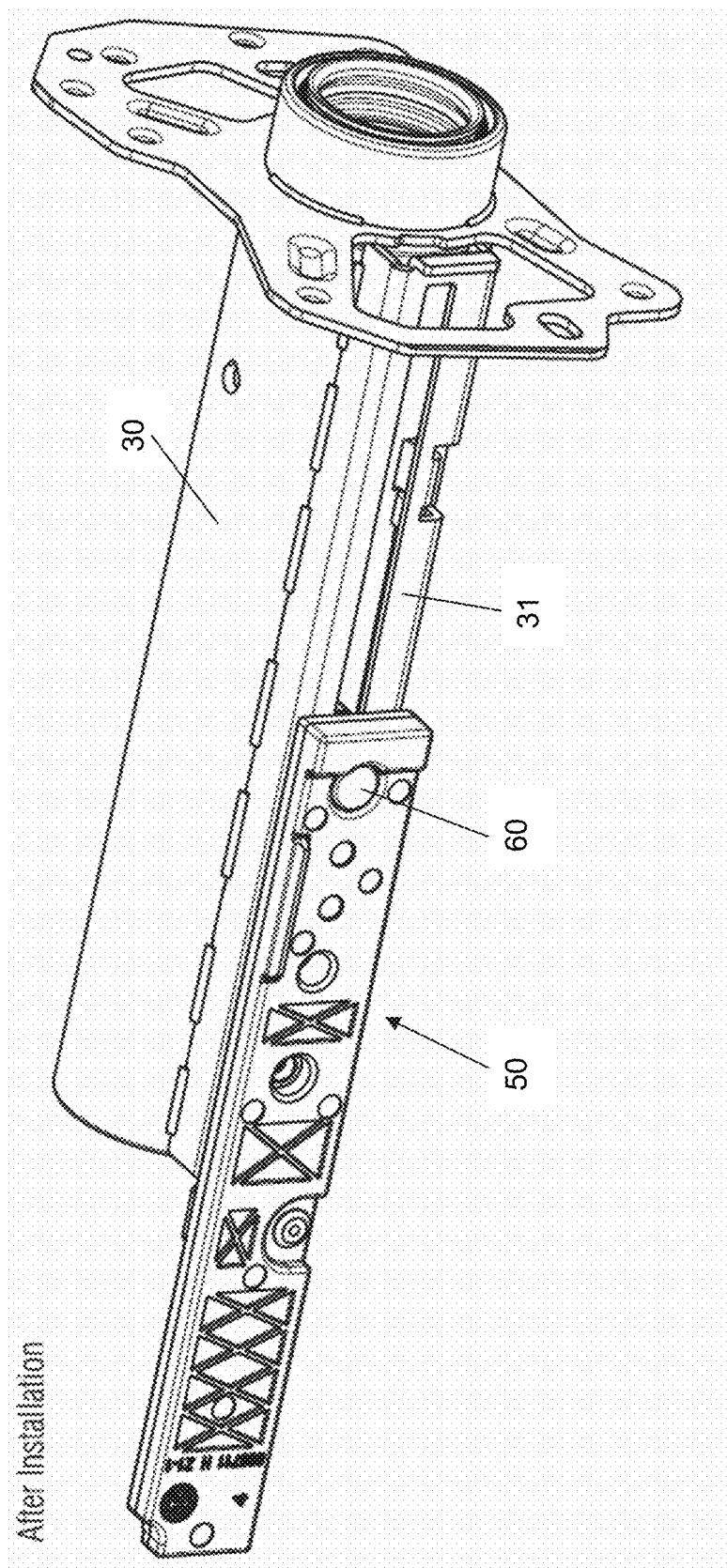
FIG. 4 is a perspective view of a steering column assembly with the support assembly and motorized adjustment assembly removed to show the length adjustment support in an assembled state.

FIG. 3 shows one aspect of a steering column according to the disclosure. The steering spindle jacket 30 includes the jacket housing 31 attached to an outside of the spindle jacket. The jacket housing 31 has a generally elongate, C-shaped channel shape that extends along the longitudinal axis A of the steering spindle jacket 30. The jacket housing 31 is sized and shaped to enclose an elongate, generally rectangular interior space 52 that is accessible through an elongate, axial slot 54. The length adjustment support 50 may include a one-piece structural member 56, that has a generally elongate, rectangular form aligned with the axis A and is disposed alongside the jacket housing 31. The length adjustment structural member 56 may be metal or any suitable material capable of carrying the loads necessary for proper functioning of the energy absorbing assembly 58, which will be described in more detail herein. FIG. 3 shows an unassembled condition of the length adjustment support 50 with a pin 60 aligned with, but not yet received within, a counter-sunk opening 62 formed through the length adjustment structural member 56. The pin 60 may be a cylindrical or tapered part or may be threaded and formed as a screw or may be knurled. For context, the side of the length adjustment structural member 56 facing away from the jacket housing 31 will be referred to as the outside surface 64. FIG. 4 shows the pin 60 installed into the opening 62 such that the length adjustment support 50 is held flush on the jacket housing 31.

Figure 7:
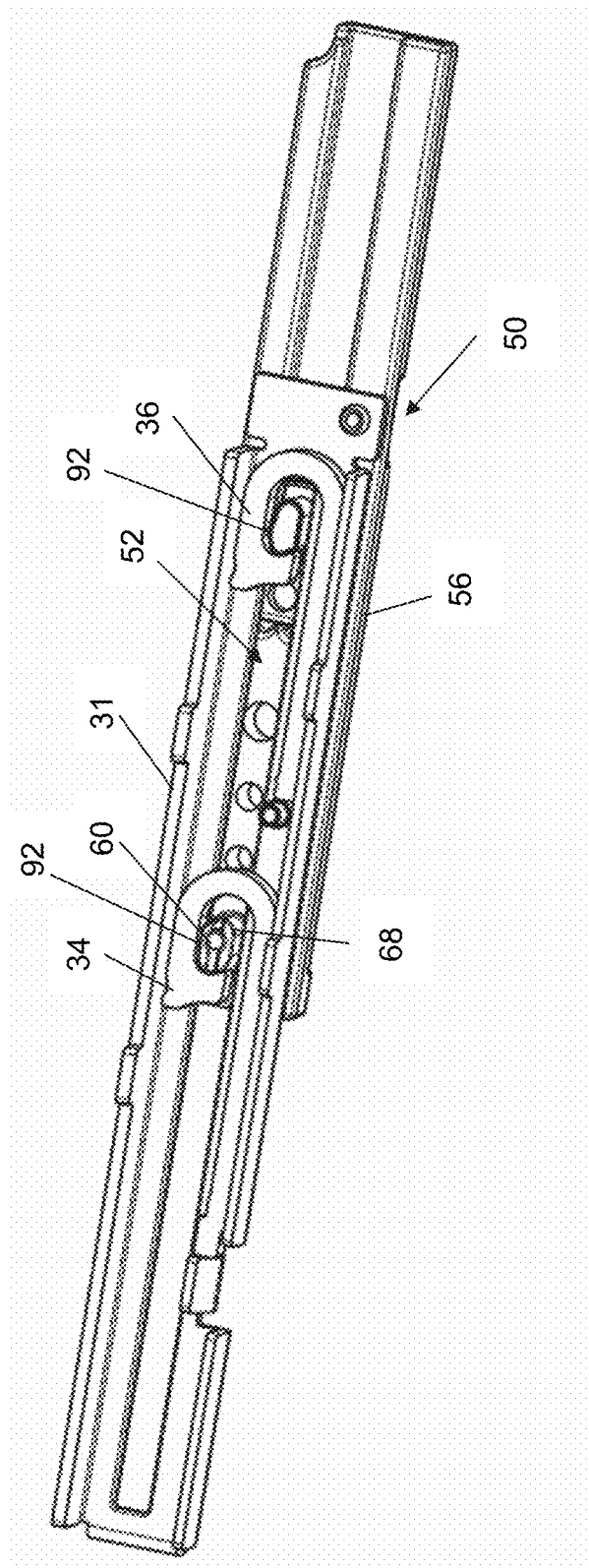
FIG. 7 is a perspective view of the rail and bending wires.

FIG. 6 is a cross sectional view taken through 6-6 of the device shown in FIG. 5 in an assembled state. FIG. 5 shows how the length adjustment support 50 is attached to the energy absorbing element(s) 34, 36 inside the jacket housing 31. FIG. 5 is shown the view from outside the jacket housing 31 and FIG. 7 shows the inside view (from inside the jacket housing). Pin 60 is inserted through opening 62. The structural member 56 includes a post, sleeve, or tubular extension 68 that protrudes inwardly from the inside surface 66 of the structural member. The sleeve 68 is integral to the structural member 56 and formed as a hollow one-piece construction. The fit of the pin 60 to the sleeve 68 is such that the sleeve is caused to expand when the pin is inserted. The sleeve 68 may also be solid, as will be shown below.

The integral construction of the sleeve 68 with the structural member 56 eliminates any free play between a separate structural member 56 and sleeve construction, which increases the accuracy of the tracking of the length adjustment support 50 on the jacket housing 31 and within the support assembly 22 (see FIG. 1) and the reliability of the energy absorbing assembly 58 and associated structure(s).

The insertion of the pin 60 is performed after the structural member 56 of the length adjustment support 50 is positioned against the jacket housing 31 and the sleeve 68 is inserted into the slot 54. When the pin 60 is inserted the sleeve 68 is caused to expand, which flares the terminal end 70 of the sleeve such that the diameter of the sleeve is greater at the terminal end than the diameter of the slot 54, thereby causing the structural member 56 of the length adjustment support 50 to be captured to the jacket housing 31, while being free to move axially in the slot. In the position shown in FIG. 6, the sleeve 68 and pin 60 reach into the interior 52 of the jacket housing 31 where the sleeve and pin engage with an energy absorbing element 34. In this configuration, the combination of the length adjustment support 50 and pin 60 enable forces to be transmitted between the length adjustment support 50 and the energy absorbing element(s) 34. In this manner, the engagement of the length adjustment support 50 and energy absorbing element(s) 34 could be considered direct because the sleeve 68 is part of the energy absorbing element. However, in other embodiments, the connection may be indirect, where no sleeve is provided as will be shown below.

Under normal operating conditions, when the length adjustment support 50 is moved axially by the motor drive assembly 38, the length adjustment support 50 contacts, but does not exert a force through sleeve/pin 68, 60 on the jacket housing 31 and steering spindle jacket 30. The sleeve/pin 68/60 does have a press fit 90 into the slot 54 (see FIG. 3), via structures 92 (see FIG. 7), which may be in the form of bumps or extensions or the like.

During a vehicle crash the steering spindle jacket 30 is moved by impact of the vehicle occupant, which causes the energy absorbing element 34 to be deformed, as is known, thereby absorbing at least some of the energy generated by the impact.

Figure 8:
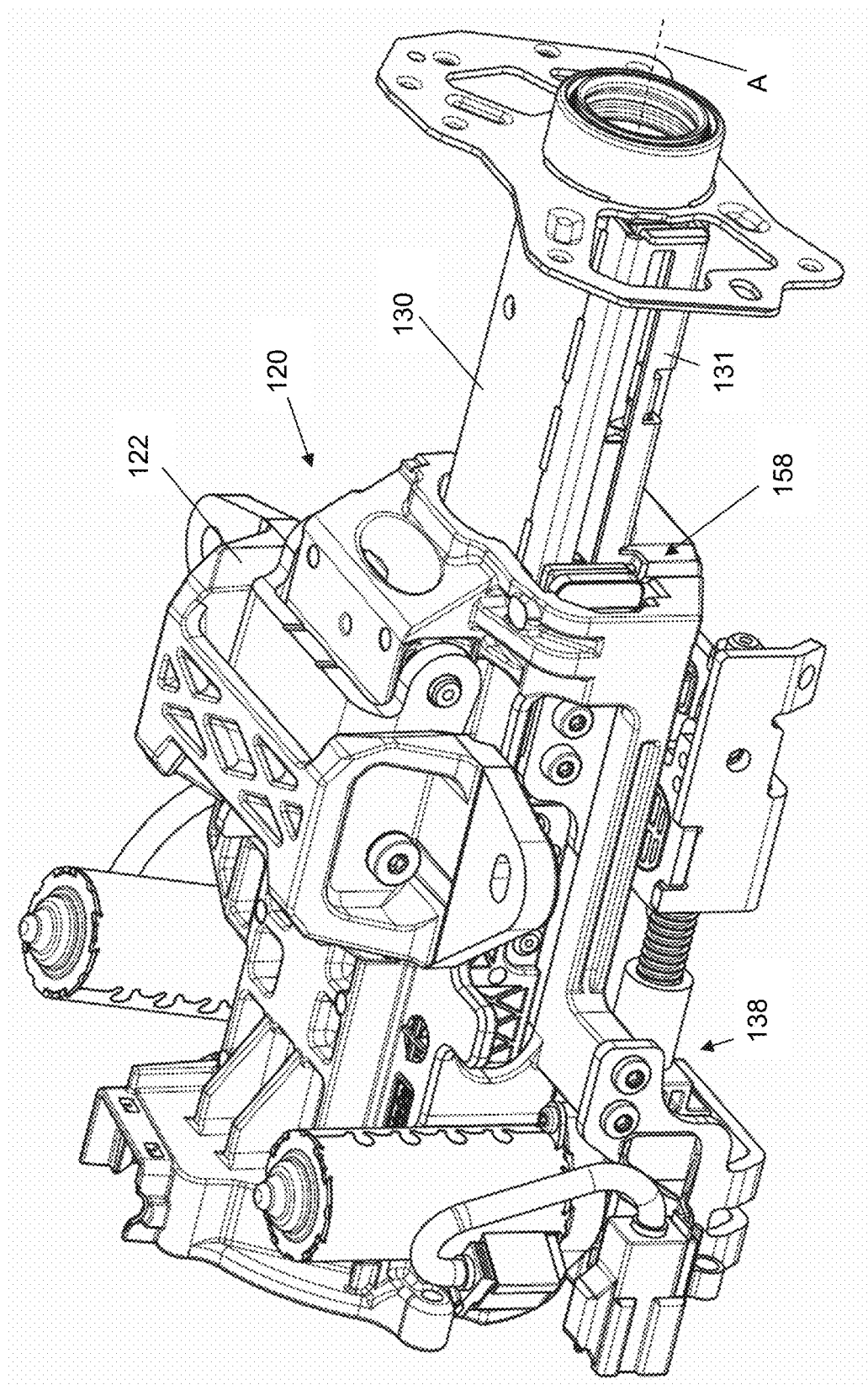
FIG. 8 is a perspective view of a steering column assembly.

FIG. 8 shows a steering column 120 with a jacket housing 131 configured to supply a reliable connection to a length adjustment support 150, and thereby provide a reliable energy absorbing assembly 158 and associated structure(s). As in the above-described steering column, a support assembly 122 is configured to attach to a vehicle via fasteners or any suitable fastening method, and is configured to receive a steering spindle jacket 130 so as to permit movement thereof in an axial direction A.

A motor drive assembly 138 is configured to extend and retract the steering spindle jacket 130 relative to the support assembly 122 along axis A. An energy absorbing assembly 158 is disposed so as to absorb impact energy when the steering column 120 is impacted during a vehicle crash event. At least some elements of the energy absorbing assembly 158 is contained within the jacket housing 131, with the jacket housing attached to the side of the steering spindle jacket 130.

Figure 9:
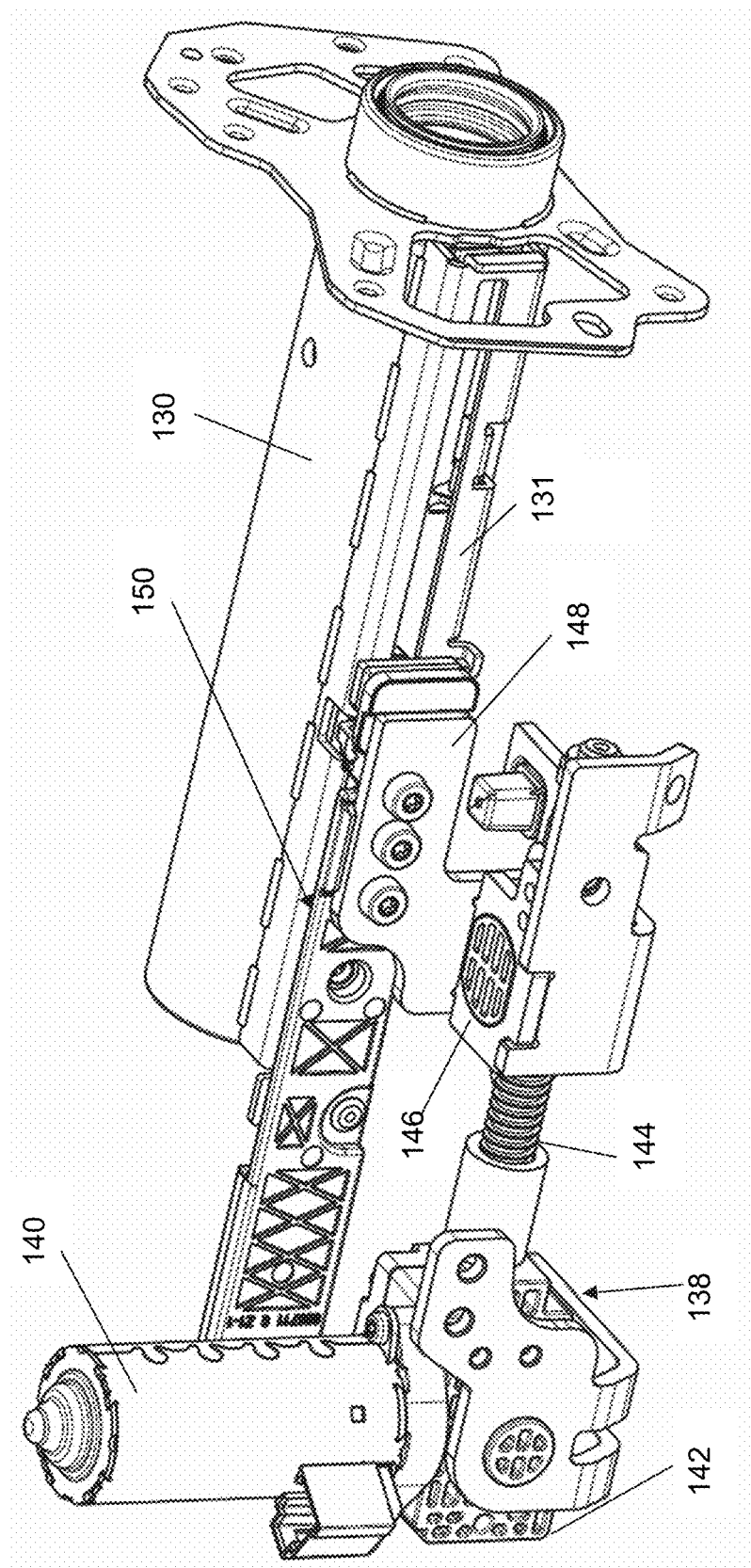
FIG. 9 is a perspective view of a steering column assembly of FIG. 8 with the support assembly removed.

FIG. 9 shows the motor drive assembly 138 attached to the support assembly 122 (see FIG. 8) which includes a motor 140. A gearbox 142 maybe operatively connected to the motor 140 such that operation of the motor causes the gearbox to transmit rotational force from the motor through the gearbox. A drive screw 144 is turned by operation of the gearbox 142. Alternatively, the motor 140 may drive the drive screw 144 directly, without a gearbox 142. Alternatively, the motor 140 may drive a nut and translate by operation of a screw which is rotational fixed on the length adjustment support 150, wherein the nut is supported in the motor drive assembly housing and is driven by the motor 140.

The drive screw 144 engages with a captured nut 146 or the like. The nut 146 is part of, captured by, or housed on a drive bracket 148 that is attached to a length adjustment support 150. The length adjustment support 150 interacts with the steering spindle jacket 130 through the jacket housing 131 in a manner that will be described in detail hereinbelow.

Figure 10:
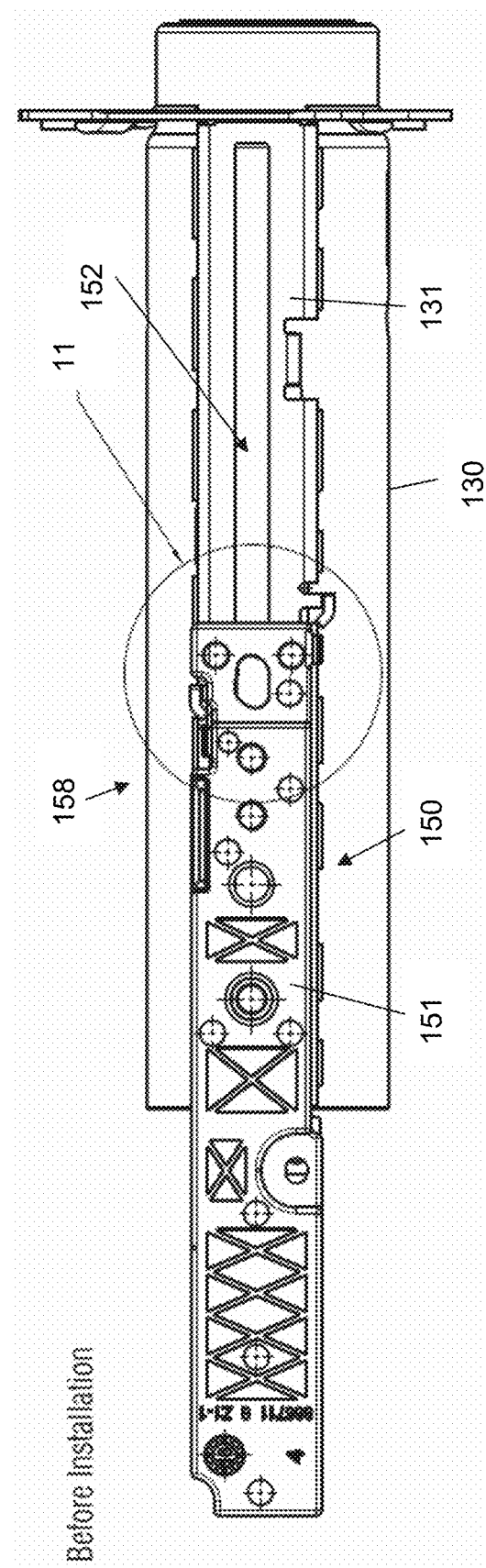
FIG. 10 is a side view of the length adjustment support and rail of FIG. 8 before installation.
Figure 11:
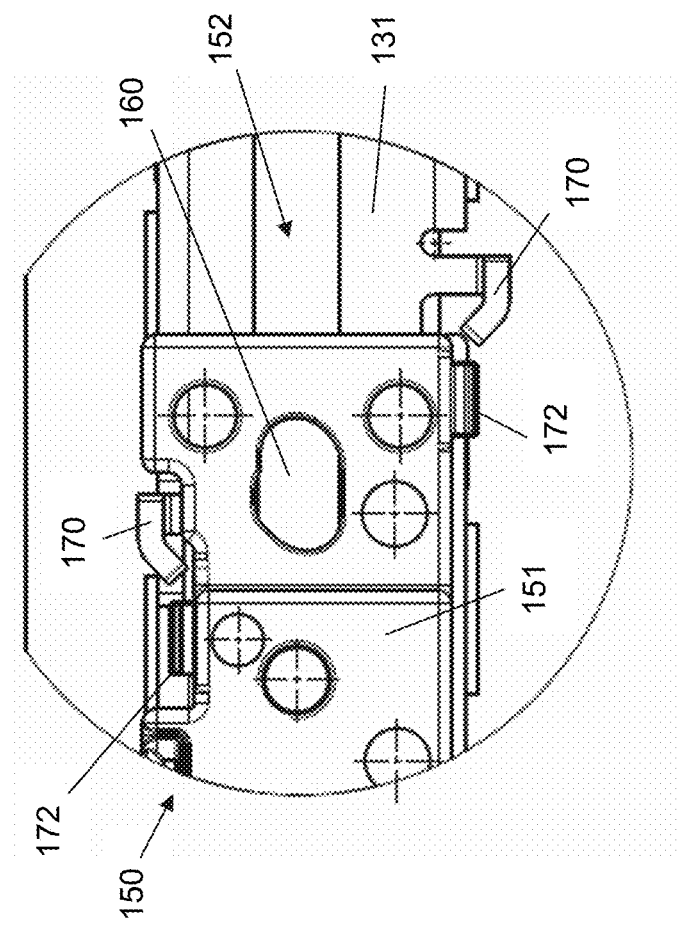
FIG. 11 is a close up view of the retaining hooks on the rail of FIG. 10.

FIG. 10 shows the view from outside the jacket housing 131. The jacket housing 131 is attached to the outside of the steering spindle jacket 130 and may be an elongate, generally rectangular shape that encloses an interior 152 space. The support body 151 may be made of any suitable material, such as aluminum and alloys thereof, by any suitable manufacturing method such as casting or forging and is shown in more detail in FIGS. 11-14. In particular, as shown in FIGS. 11 and 13, the engagement of the length adjustment support 150 and the jacket housing 131 is caused by the overlap of retaining arms 170 formed on the jacket housing with retaining tabs 172 formed on the support body 151. FIG. 11 shows the support body 151 position before engagement with the jacket housing 131. FIG. 13 shows the support body 151 position after engagement with the jacket housing 131.

Referring to FIGS. 11-14, the engagement of the support body 151 with the jacket housing 131 takes place by positioning the length adjustment support 150 alongside and in contact with the jacket housing 131. The support body 151 includes a pin, also referred to as a carrier (not shown, same as 174), 160 that is pressed in the support body so as to extend into the interior 152 of the jacket housing 131 and into operative engagement with one of the energy absorbing elements, also referred to as a crash wire. In this embodiment, the part of the pin 160 that extends into the interior 152 may be a solid or hollow post in contrast to the pin or screw and expandable sleeve arrangement of the above embodiment. In another embodiment, the energy absorbing element may be a bend-tearing sheet or a squeezed strip or other deformable elements.

The support body 151 includes a pair of retaining tabs 172 extending laterally from the length adjustment support 150. The jacket housing 131 has complementary retaining arms 170 that are positioned, sized, and shaped to engage the retaining tabs 172 when the length adjustment support 150 is positioned with the tabs underneath and captured by the arms as shown in FIG. 14. Accordingly, the support body 151 is held in firm contact with the support jacket housing 131 and prevented from becoming disengaged therefrom, while at the same time being permitted to slide along the jacket housing when experiencing forces corresponding to a crash event and actuating the energy absorbing assembly 158.

Figure 12:
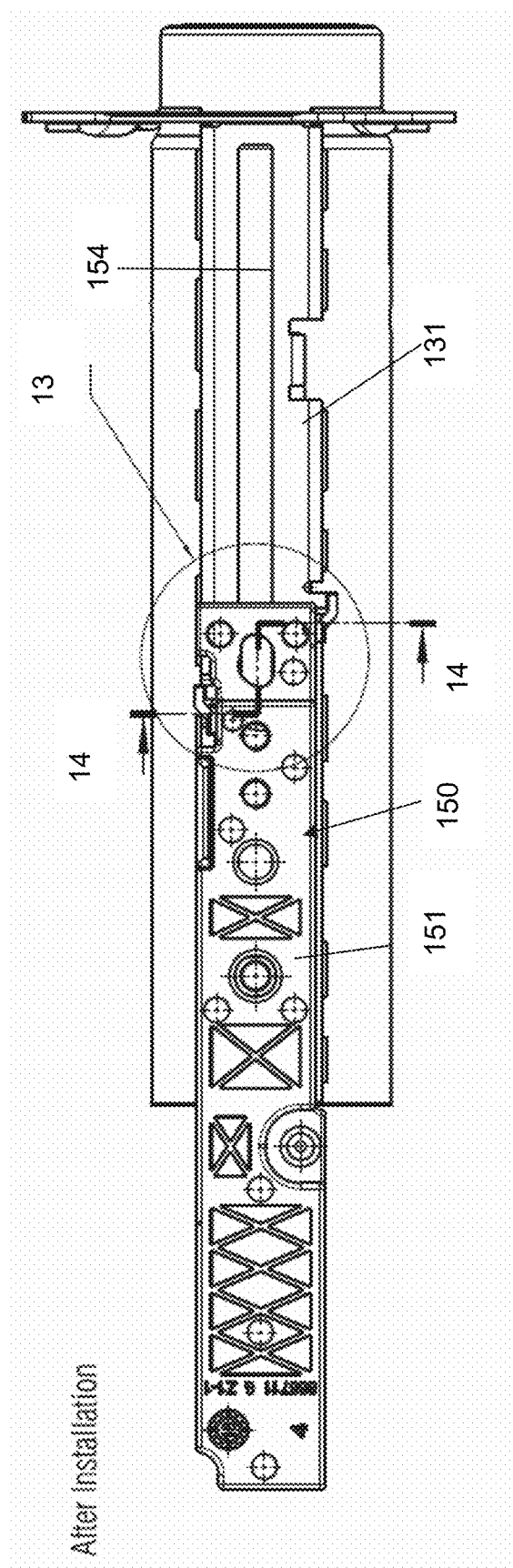
FIG. 12 is a side view of the length adjustment support and rail of FIG. 8 after installation.

As can be seen in FIGS. 10 and 11, which represents a before-installation configuration of the length adjustment support 150, the retaining arms 170 formed on the jacket housing 131 are spaced from and thus not in engagement with the tabs 172 formed on the support body 151 and the pin body 161. FIG. 12-14 shows the engaged or after-installation configuration of the length adjustment support 150, with the retaining arms 170 formed on the jacket housing 131 in engagement with the tabs 172 formed on the support body 151 and the pin body 161.

Figure 15:
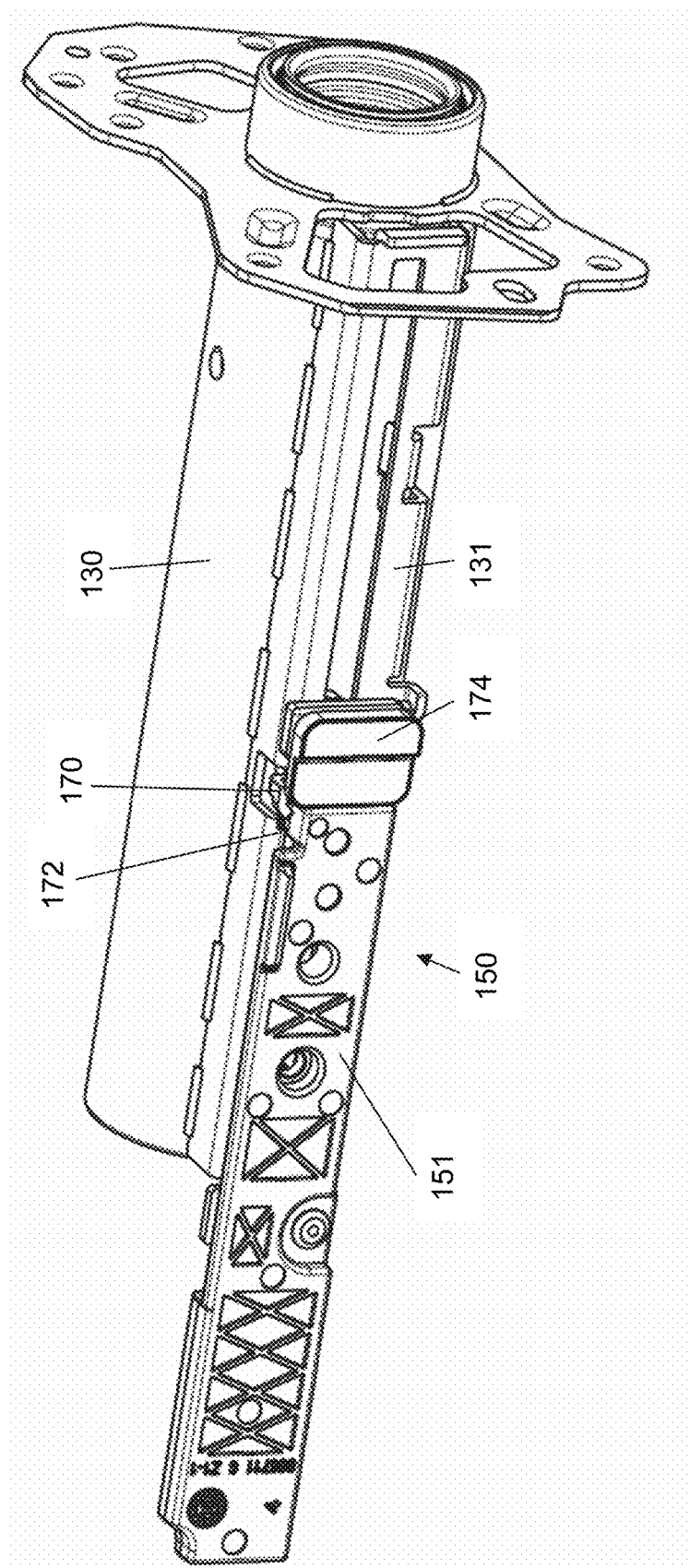
FIG. 15 a perspective view of a length adjustment support and rail.
Figure 16:
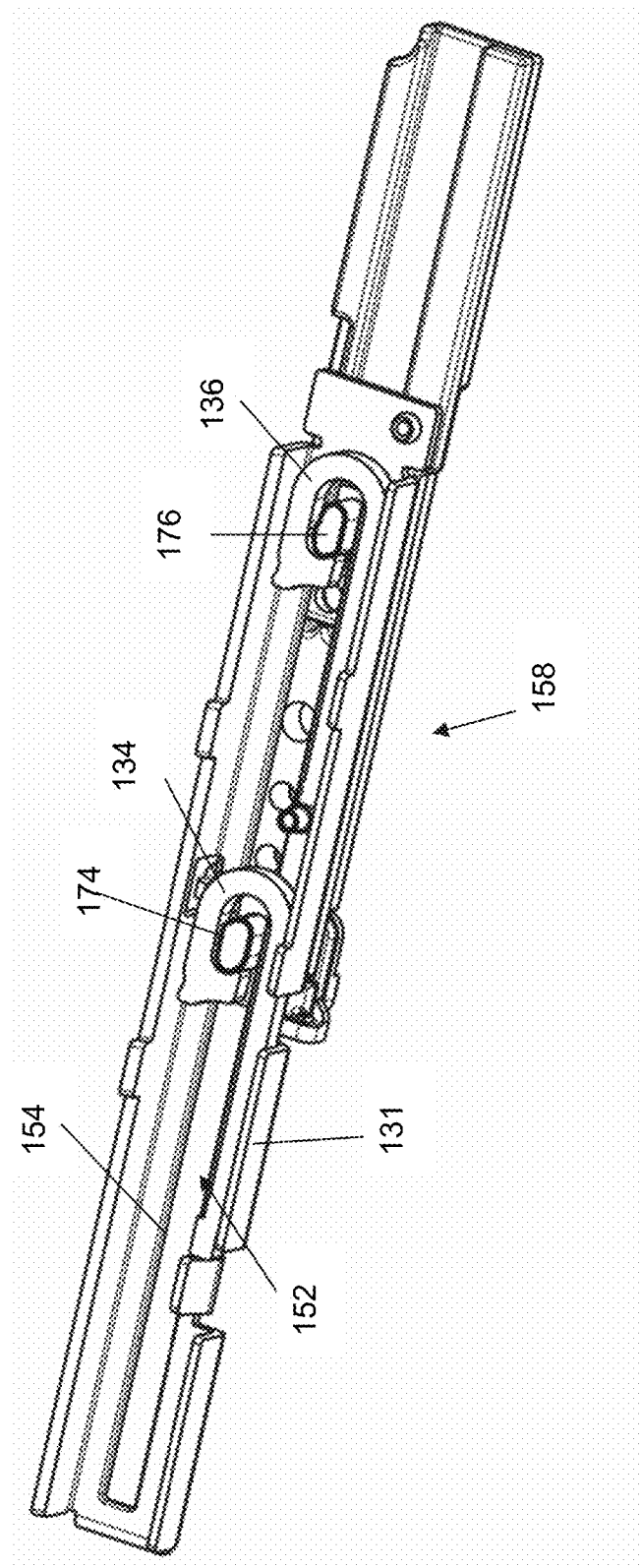
FIG. 16 is a perspective view of the rail and bending wires of FIG. 15.

FIGS. 15 and 16 is an embodiment of a device as depicted in FIG. 4, with a length adjustment support 150 comprising a support body 151 and separate carrier 174. The energy absorbing elements 134, 136 are disposed within the interior 152 of the jacket housing 131. The carrier 174 includes with a solid post or sleeve pressed into the support body 151 and a second post or sleeve 176 formed integrally on or pressed into the support body. The assembled length adjustment support 150 engages with the energy absorbing elements 134, 136. The posts 174, 176 are positioned to respectively engage with and act upon a respective one of the energy absorbing elements 134, 136. The operation of this steering column is generally the same as in the above embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An energy absorption assembly for a steering column for a vehicle, comprising:
    an axially movable steering spindle jacket;
    a jacket housing attached to the steering spindle jacket, the jacket housing comprising a slot formed therethrough and an interior space;
    an energy absorbing element disposed and retained within the interior space;
    a motor drive assembly configured to cause the steering spindle jacket to extend and retract axially; and
    a length adjustment support operatively attached to the motor drive assembly and configured to engage the energy absorbing element,
    wherein during an impact event movement of the steering spindle jacket relative to the length adjustment support causes a post configured as a hollow sleeve to actuate the energy absorbing element to reduce the effects of the impact, wherein the length adjustment support comprises the post which extends through the slot.

2. The energy absorption assembly of claim 1, wherein the sleeve is a one-piece construction of the length adjustment support.

3. The energy adsorption assembly of claim 1, further comprising a pin that is sized and shaped to be inserted into the sleeve and when so inserted causes the sleeve to expand.

4. The energy adsorption assembly of claim 3, wherein the pin is in the form of a screw.

5. The energy absorption assembly of claim 3, wherein inserting the pin into the sleeve causes the sleeve to expand to an extent that the sleeve is captured by the slot and the length adjustment support is caused to be retained on the jacket housing.

6. An energy absorption assembly for a steering column for a vehicle, comprising:
    an axially movable steering spindle jacket;
    a jacket housing attached to the steering spindle jacket, the jacket housing comprising a slot formed therethrough and an interior space;
    an energy absorbing element disposed and retained within the interior space;
    a motor drive assembly configured to cause the steering spindle jacket to extend and retract axially; and
    a length adjustment support operatively attached to the motor drive assembly and configured to engage the energy absorbing element,
    wherein during an impact event movement of the steering spindle jacket relative to the length adjustment support causes a post to actuate the energy absorbing element to reduce the effects of the impact,
    wherein the length adjustment support comprises a support body and a separate pin body, the pin body comprising the post,
    wherein the jacket housing comprises retaining arms and the support body and the pin body both comprise retaining tabs.

7. The energy absorption assembly of claim 6 wherein the retaining arms are disposed on the jacket housing so as to engage with the retaining tabs so as to retain the length adjustment support to the jacket housing.

8. An energy absorption assembly for a steering column, the energy absorption assembly comprising:
    a steering spindle jacket that is axially movable;
    a jacket housing that is attached to the steering spindle jacket and comprises a slot formed therethrough and an interior space;
    an energy absorbing element disposed and retained in the interior space;
    a length adjustment support configured to engage the energy absorbing element,
    wherein the length adjustment support comprises a hollow sleeve that is received in the slot of the jacket housing; and
    a pin that is inserted or configured to be inserted into the hollow sleeve to cause the hollow sleeve to expand and thereby retain the length adjustment support on the jacket housing,
    wherein during an impact event movement of the steering spindle jacket relative to the length adjustment support actuates the energy absorbing element to reduce effects of the impact event.

9. The energy absorption assembly of claim 8 wherein the energy absorbing element is a crash wire.

10. The energy absorption assembly of claim 8 wherein the hollow sleeve is integral with a remainder of the length adjustment support.

11. The energy absorption assembly of claim 8 wherein the length adjustment support comprises a support body and a separate pin body, with the separate pin body comprising the hollow sleeve.

12. The energy absorption assembly of claim 8 wherein the length adjustment support is countersunk or counterbored at the hollow sleeve such that a head of the pin is configured to sit flush with a surface of the length adjustment support.

13. The energy absorption assembly of claim 8 wherein the hollow sleeve is configured to be fixed along the slot of the jacket housing until an impact event, at which point the hollow sleeve is configured to travel along the slot of the jacket housing.

14. The energy absorption assembly of claim 8 wherein a terminal end of the hollow sleeve protrudes into and engages an opening of the energy absorbing element.

15. The energy absorption assembly of claim 8 wherein the pin is a screw.

16. The energy absorption assembly of claim 8 wherein the pin includes knurling.

17. The energy absorption assembly of claim 8 comprising a motor drive assembly configured to cause the steering spindle jacket to extend and retract axially.

18. The energy absorption assembly of claim 8 wherein the jacket housing is configured to enclose an elongate, generally rectangular interior space that is accessible through the slot.

* * * * *